Dec. 15, 1931. W. L. DE BAUFRE 1,836,580
BEARING LUBRICATION
Filed March 10, 1928
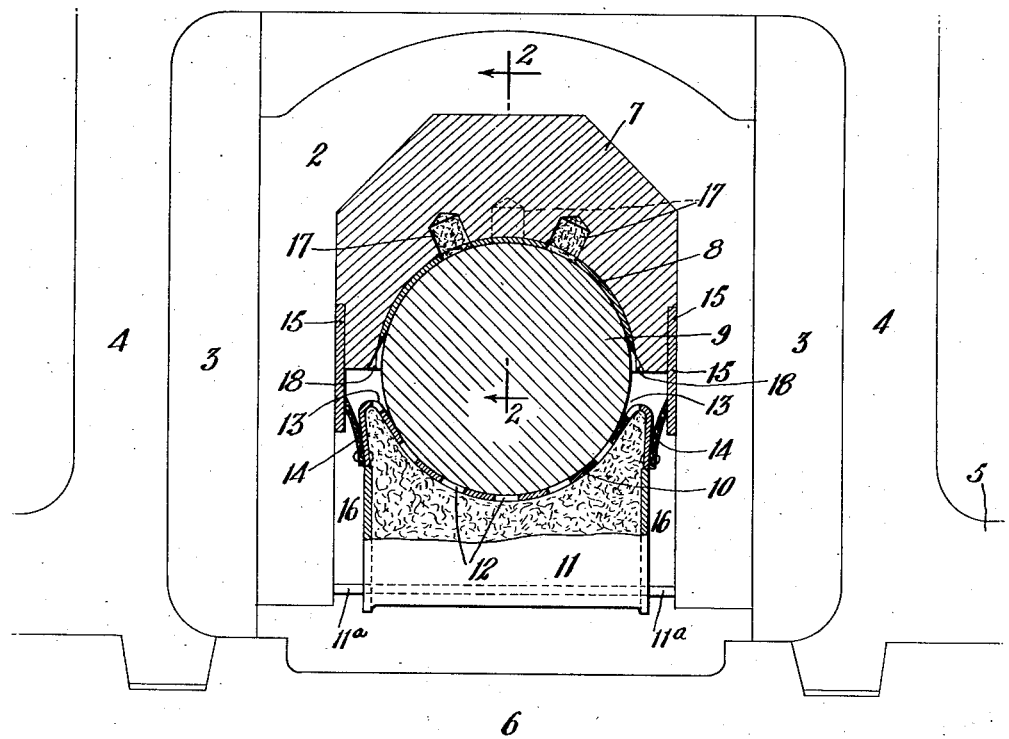
Fig: 1.
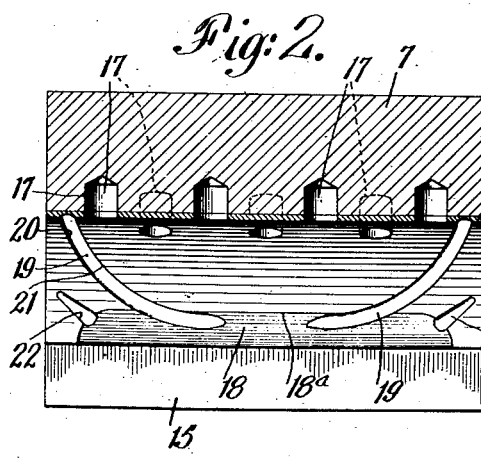
Fig: 2.
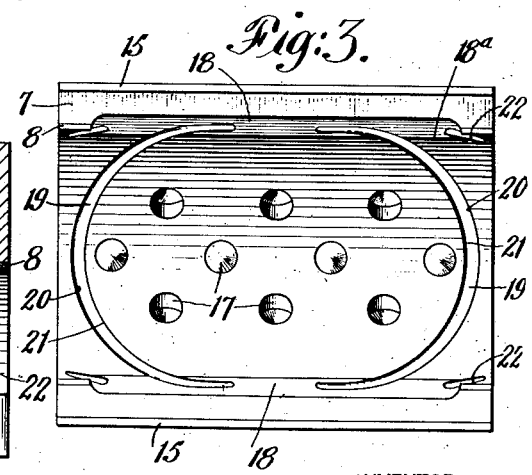
Fig: 3.
INVENTOR
William L. De Baufre
BY
Synnestvedt + Lechner
ATTORNEYS Patented Dec. 15, 1931

1,836,580

UNITED STATES PATENT OFFICE

WILLIAM L. DE BAUFRE, OF LEONIA, NEW JERSEY, ASSIGNOR TO FRANKLIN RAILWAY SUPPLY COMPANY, OF NEW YORK, N. Y., A CORPORATION OF DELAWARE

BEARING LUBRICATION

Application filed March 10, 1928. Serial No. 260,724.

This invention relates to bearing lubrication, and particularly to the lubrication of axle journal bearings such, for example, as employed in railway vehicles.

Heretofore, while driving-box journals have been lubricated by grease-lubrication, which has certain advantages over oil-lubrication, such as the obviation of very frequent inspection of bearings and renewal of the lubricant, applications of grease lubrication to locomotive pilot and trailer axles, tender axles, and others, have proven unsatisfactory. This has been due in part to the fact that the journals of such axles are subjected to a substantially steady or uniform pressure, rather than to the variable pressure present in driving box bearings, and the alteration in pressure in the latter seems to be more effective for the proper distribution of a grease lubricant.

Heretofore most applications of grease lubrication to journal bearings have resulted in excessive wear and hot running of the bearings, and overheating and loss of grease; and, to overcome poor lubrication, the pressure on the grease cake has had to be increased, with the result that the friction between the journal and the cake itself, or between the journal and the lubricator-plate through which the cake is fed, has become so great as to raise the temperature of the grease beyond a certain critical point, above which the consumption of grease is excessive for the lubrication attained.

I aim by my invention to overcome these difficulties, and, in general, to improve grease-lubrication of bearings, conserve grease, reduce wear on bearings, journals and lubricator-plates, increase the margin of safety of operation by making unnecessary the employment of excessive grease pressures (such as would raise the temperature of the grease beyond the critical point), and make possible the effective lubrication of trailer, pilot, tender and other axles by grease lubricants.

More specifically I aim to improve bearing lubrication by improvement of both the feeding and the distribution of the lubricant, and, in particular, by providing an improved bearing and lubricator plate construction, cooperating, in a novel manner, to give better lubrication both at starting and afterwards to save grease and to reduce wear.

How I accomplish the foregoing together with such other objects and advantages as are incident to the invention or will occur to those skilled in the art will be evident from the following description, taken together with the accompanying drawings in which:—

Fig. 1 is a cross-sectional view of a journal and bearing for a railway vehicle axle, showing certain associated parts in elevation;

Fig. 2 is a section on the line 2—2 of Fig. 1; and

Fig. 3 is a bottom plan view of the bearing of Figs. 1 and 2.

Referring to the drawings in general, it will be seen that I have illustrated a bearing box 2 adapted to ride up and down between the shoes 3, 3, which are in engagement with the pedestal jaws 4, 4, of a frame structure 5, the pedestal binder 6 being also shown. In the bearing box 2 is a bearing member 7, which has preferably a lining or facing 8 of Babbitt or other bearing metal adapted to bear on the journal. Beneath the journal is a lubricant feeding device comprising a perforated plate 10, and a cellar 11 (which may be made separate from or integral with the plate 10) to contain grease or other suitable lubricant.

A spring-pressed follower plate, or other suitable means (not shown) may be employed to urge the lubricant and the plate 10 upwards against the bottom of journal 9. Any suitable cellar and follower construction may be employed, since it forms no part of the present invention, and any suitable cellar retaining means, such as the pin 11a, may be employed.

The lubricator plate 10 has a multiplicity of perforations 12, for feeding the lubricant, and I have found that in association with my improved form of bearing, the best results are attained (with ordinary driving-box grease) when the total area of the holes 12 (which are set in rows in staggered relation to each other) is from one-fourth to onethird as much as the total area of the plate, the diameter of the individual holes and the spacing between them being such that there is little or no area on the journal as it revolves which does not come into direct contact with grease, or, in other words, the sum of the diameters of the holes in two adjacent rows should approximately equal the length of the lubricator plate. At the sides of the the journal the plate is "relieved" or flared slightly outward as indicated at 13, 13. Flexible wings 14, 14, of fiber or other suitable material, may be secured at each side of the lubricator plate to cooperate with the sides of the box 2 or with metallic extensions 15 of the bearing member 7, to prevent escape of grease when the box is of such a width with relation to the plate as to leave a gap 16 therebetween.

The bearing 7, on its Babbitt-lined face 8, is provided with a plurality of pockets or cavities 17, adapted to retain grease, said pockets being arranged in staggered relation in rows lengthwise of the bearing. The bearing, at its sides, is provided with relieved portions or collecting and distributing bevels 18, such bevels preferably ending short of the ends of the bearing, to obviate grease working out of the ends of the bearing unduly as it is carried to the bevels by the revolving journal, the edge 18a of each bevel being preferably rounded off into the bearing face to facilitate the carrying in of the grease between said face and the journal.

At each end of the bearing I provide grease-intercepting grooves 19 which bend toward each other at the ends to merge with the distributing bevels 18, to which they are adapted to by-pass or return grease which might otherwise pass out the ends of the bearing from the bearing face or the pockets 17. To this end, the grooves 19 are preferably sharp at their outer edges 20 and somewhat rounded at their inner edges 21.

Small diagonal distributing grooves 22 may be provided at the corners of the bearing to feed just sufficient lubricant from the collecting or delivery bevels 18 to the ends of the bearing face outside of the grooves 19 to keep such portions of the face properly lubricated. These grooves I prefer to taper slightly and to terminate just short of the bearing ends so as to give proper distribution of the lubricant to the surfaces involved without loss of grease.

By positioning the pockets 17 adjacent the top of the bearing, as shown, where the pressure is greatest, a supply of lubricant is always there present when the bearing is cold, i. e., at starting. Furthermore, the total cross sectional area of the pockets may be made greater than any permissible area of lubricating slots or grooves (and thus provide greater lubrication at starting) by virtue of the fact that, while long slots or grooves substantially reduce the effective bearing surface, since they will support a pressure only equal to the lowest film pressure on adjacent bearing surfaces, the circle of grease contained in a small closed hole will support a pressure substantially corresponding to its location and the holes will, therefore, cause practically no reduction in effective bearing surface.

From the foregoing it will now be seen that, as grease is carried by the revolving journal 9 up one side from the perforated lubricator plate 10, it is fed to the corresponding bevel 18 of bearing 7 and thence over the entire surface 8 thereof. The pockets 17 collect and retain enough to keep them filled and ready for lubricating the journal and bearing when starting cold. At the same time sufficient grease is fed through grooves 22 to lubricate the end portions of the bearing surface. The grooves 19 carry grease which tends to work out of the bearing ends (particularly as the bearing grows warm) back to the bevel 18 on the side of the bearing opposite to that at which the grease is being delivered. Likewise, any grease which may be carried directly through the bearing by the journal passes to such bevel, and from the bevel the grease is carried on down to the bevelled or relieved edge 13 of the lubricator plate where it collects, to be carried over the surface of said plate and again to the bearing.

With this construction, therefore, I provide for proper feeding and distribution of the lubricant, return of excess grease to the point of feed, prevention of grease losses at the ends and sides of the bearing or at the edges of the lubricator plate even over a wide range of bearing and grease-cake pressures, and thorough lubrication of the bearing when cold or hot, and I have thus made practicable the application of grease-cake lubrication to many installations in which such lubrication has heretofore been unsatisfactory.

What I claim is:—

1. A journal lubricating device comprising, in combination, a bearing, a lubricant feeder therefor, lubricant-retaining means in the bearing face, and separate lubricant-intercepting means extending from a point adjacent an end of the bearing to a point adjacent a side of the bearing to intercept escaping lubricant and return it to a point of use.

2. A journal lubricating device comprising, in combination, a bearing, a lubricant feeder therefor, lubricant-retaining means in the bearing face, and lubricant-intercepting means extending from a point adjacent an end of the bearing to a point adjacent a side of the bearing to intercept escaping lubricant and return it to a point of use, said intercepting means including a groove separate from the retaining means for by-passing lubricant around said retaining means.

3. A journal lubricating device comprising, in combination, a bearing, a lubricant feeder therefor, lubricant-retaining means in the bearing face, and lubricant-intercepting means extending from a point adjacent an end of the bearing to a point adjacent a side of the bearing to intercept escaping lubricant and return it to a point of use, said intercepting means including a groove sharp along one of its edges and bevelled along the other.

4. A journal lubricating device comprising in combination, a bearing, a lubricant feeder therefor, lubricant-retaining means in the bearing face, lubricant-intercepting means extending from a point adjacent an end of the bearing to a point adjacent a side of the bearing to intercept escaping lubricant and return it to a point of use, said intercepting means including a groove by-passing lubricant around said retaining means, and supplemental grooves at the corners of the bearing face.

5. A journal lubricating device comprising, in combination, a bearing, a lubricant feeder from which lubricant may be carried by the journal, in revolving, to said bearing, a bevelled edge at the side of the bearing, and a lubricant duct from the end of the bearing to said bevelled edge.

6. A journal lubricating device comprising, in combination, a bearing, a lubricant feeder from which lubricant may be carried by the journal, in revolving, to said bearing, a bevelled edge at the side of the bearing, and a lubricant duct from the end of the bearing to said bevelled edge, said bevel ending short of the bearing ends.

7. A journal lubricating device comprising, in combination, a bearing, a lubricant feeder from which lubricant may be carried by the journal, in revolving, to said bearing, a bevelled edge at the side of the bearing, and a lubricant duct from the end of the bearing to said bevelled edge, together with lubricant retaining means on the bearing face intermediate the ends and the sides of the bearing.

8. A journal lubricating device comprising, in combination, a bearing, a lubricant feeder from which lubricant may be carried by the journal, in revolving, to said bearing, a bevelled edge at the side of the bearing, and a lubricant duct from the end of the bearing to said bevelled edge, together with lubricant retaining means on the bearing face intermediate the ends and the sides of the bearing comprising a plurality of recesses in spaced relation to each other.

9. A journal lubricating device comprising, in combination, a bearing, a lubricant feeder from which lubricant may be carried by the journal, in revolving, to said bearing, a bevelled edge at the side of the bearing, and a lubricant duct from the end of the bearing to said bevelled edge, together with lubricant retaining means on the bearing face intermediate the ends and the sides of the bearing comprising a plurality of recesses in spaced and staggered relation to each other.

10. A journal lubricating device comprising, in combination, a lubricant feeder, a bearing member, means for conducting lubricant from a side of the bearing member to the surfaces at the ends thereof, and means adapted to prevent escape of lubricant from the ends of the bearing.

11. A journal lubricating device comprising, in combination, a lubricant feeder, a bearing member, means for conducting lubricant from a side of the bearing member to the surfaces at the ends thereof, and means adapted to prevent escape of lubricant from the ends of the bearing and to return lubricant to a side thereof.

12. A journal lubricating device comprising, in combination, a lubricant feeder, including a plate adapted to bear on said journal and having a bevel along each side, a bearing adapted to fit the journal and having a bevel along each side, and means at each side of said bevelled plate adapted to prevent escape of the lubricant.

13. A journal lubricating device comprising, in combination, a lubricant feeder, a bearing member having lubricant distributor means at each side thereof including lubricant channels extending toward the ends of the bearing adjacent the corners, and lubricant intercepting means extending from the end portions of the bearing intermediate its sides to said distributor means at the sides.

In testimony whereof I have hereunto signed my name.

WILLIAM L. DE BAUFRE.